United States Patent
Rubio

[15] 3,653,915
[45] Apr. 4, 1972

[54] TORTILLA AND PROCESS USING MONO-OR DIGLYCERIDE

[72] Inventor: Manuel Jesus Rubio, 192 Benham Ave., Bridgeport, Conn. 06605

[22] Filed: June 8, 1970

[21] Appl. No.: 44,586

[52] U.S. Cl. ..........................................................99/80 R
[51] Int. Cl. ..............................................................A21d 2/10
[58] Field of Search................................99/80, 86, 91, 92, 93

[56] References Cited

UNITED STATES PATENTS

| | | | |
|---|---|---|---|
| 2,002,053 | 5/1935 | Doolin | 99/80 R |
| 2,509,927 | 5/1950 | Johnston | 99/91 |
| 2,584,893 | 2/1952 | Lloyd et al. | 99/93 |
| 3,369,908 | 2/1968 | Gonzalez et al. | 99/93 |

*Primary Examiner*—Raymond N. Jones
*Attorney*—Jackson, Jackson and Chovanes

[57] ABSTRACT

To retard the staling of tortillas, which are an unleavened unshortened food product made from nixtamalized corn or corn flour by incorporating an additive in making the tortilla dough. The additive is mono- or diglyceride or the like.

6 Claims, No Drawings

TORTILLA AND PROCESS USING MONO-OR DIGLYCERIDE

DISCLOSURE OF INVENTION

The present invention relates to retarding the staling of tortillas.

Many expedients which apply for preventing staling to the usual wheat, whole wheat or rye bread, commonly eaten, are not effective when applied to tortillas because of the marked differences in their composition from the breads mentioned above. Among these differences are:

1. Tortillas are made from whole corn, that is, corn which contains its germ, hull, bran, etc. Bread is made from dehulled, degermed and debranned wheat.
2. Dehulled, degermed, debranned wheat used in making bread undergoes no chemical treatment before grinding. Whole corn used in making tortillas always undergoes the chemical treatment of steeping in limewater at pH 12 before grinding.
3. Dehulled, degermed, debranned wheat used in making bread is ground into a flour in the dry state. Steeped whole corn used in making tortillas is ground into a dough in the wet state, after which the dough is either dried into a flour or used directly to make tortillas.
4. The dough used for making bread is always prepared from dry dehulled, degermed, debranned wheat flour. The dough used for making tortillas may be prepared either from dry limed whole corn flour or directly by grinding whole corn steeped in limewater at pH 12.
5. In addition to dehulled, degermed, debranned wheat flour, the dough used for making bread always contains some of the following ingredients: shortening, a leavening agent (yeast, air, or baking powder), salt, sugar, milk solids or milk, eggs or egg solids, and water. Dough used in making tortillas only contains ground limed whole corn and water.
6. The final moisture content of bread after baking is approximately 20%; that of tortillas after cooking is approximately 45%. Due to its lower moisture content, bread is much less subject to microbial spoilage than tortillas.
7. Bread is baked inside an oven by hot air at a temperature of 425°–500° F. for 30 to 60 minutes. Tortillas are cooked on a hot plage at 290°–410° F., each side or face being exposed alternately to the heat for 15 to 20 seconds after which the first side is again exposed for an additional 15 to 20 seconds.
8. Other differences between bread and tortillas are the following:
   a. Dehulled, degermed, debranned wheat flour used in breadmaking is usually bleached; limed corn flour used for making tortillas is never bleached.
   b. Bread is usually leavened; tortillas are never leavened.
   c. Bread is always baked in the shape of loaves or rolls; tortillas are always shaped in the form of round, flat discs.
   d. The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below.

Flat discs of dough of diameter 4–6 inches and height 2–3 millimeters are prepared either by hand, by use of any mechanical equipment which squashes or presses pieces of dough, or by any suitable automatic machine.

After they have been made, the flat discs of dough are cooked on a hot plate whose temperature varies from 290°–410° F. In the cooking process, each face or side of the disc is alternately exposed to the heat for 15 to 20 seconds, after which the first side is again exposed for an additional 15 to 20 seconds.

The cooked discs or tortillas have a moisture content of 40–48% and are ready to eat.

Limed corn dough may be prepared from limed corn flour of size smaller than 45 U.S. Standard Mesh, 8 to 12 percent moisture content and pH 6–7. The dough is made by mixing 1.0 to 1.4 pounds of tap water per pound of flour.

Limed corn dough may also be made directly by grinding corn which has been steeped in limewater. In such case 1 pound of corn is steeped overnight in 0.5 to 0.8 pounds of water, initially at boiling temperature, which contains 0.5 to 1.5% calcium hydroxide. It should be noted that when the corn is added to the limewater, the latter is either at or close to its boiling temperature. However, after both ingredients have been mixed, no further heat is applied so that the temperature of the mixture drops gradually during the steeping process.

It might be mentioned that tortillas, when normally prepared as described herein and without additives of any kind, have a maximum shelf life of 12 to 15 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after 24 hours, marked after 48 hours and almost complete after 72 hours if the product is kept at room temperature. It should be noted that the hardening or staling effect increases with decreasing temperature until the freezing point of water in the product is reached. At temperatures below room temperature but above the freezing point of water in the tortillas, therefore, hardening proceeds at a faster rate than at room temperature and vice-versa.

In determining the flexibility index a tortilla is bent around a bar of known radius, and this is tried with successively larger bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

Table 1 gives typical values for variation of the flexibility index of tortillas with time at room temperature.

Table 1. Variation of the Flexibility Index of Tortillas with Time at Room Temperature Flexibility index after the following elapsed time 0 hr. 24 hr. 48 hr. 72 hr. 96 hr. 8.5 7.7 6.5 6.0 5.5

Hardening or loss of flexibility of tortillas is believed to be due to a physico-chemical change in the starch constituent of tortillas which is known as retrogradation. This phenomenon has been studied in substances other than tortillas and is described in the technical literature (Whistler 1965).

The additive of the present invention imparts the property or retarding the loss of flexibility of tortillas with time. It must be mixed with the dough used for making tortillas, although as later explained, the mixture may be achieved in various ways.

Thus, in respect to this aspect of the invention, tortillas stored under conditions in which no moisture is lost from them become stale more slowly because of the additive of the invention, which retards hardening with time, retards loss of flexibility with time, increases the freshness of the tortillas, prolongs the flexible shelf life of the tortillas and increases the freshness of both freshly made tortillas and also reheated tortillas.

MONO- AND DIGLYCERIDES

Mono- and diglycerides of long chain fatty acids and similar compounds provide surface active additives which are effective in the present invention because of their amphiphilic nature and interfacial activity. They absorb on the surface of the starch molecules and prevent them from association or retrogradation.

For the purpose of the invention mono- and diglycerides or mixtures thereof of saturated or unsaturated fatty acids having carbon chain lengths of 9 to 21 carbon atoms whether saturated or unsaturated may be used in the invention.

Examples are lauric, myristic, palmitic, stearic, behinic in the saturated group and oleic, linoleic, ricinoleic and linolenic in the unsaturated group. A related compound which may be used is polyoxyethylene monostearate having approximately 20-40 ethylene oxide units per molecule.

In order to increase the flexibility of tortillas during storage without loss of moisture, the quantity of mono- or diglyceride or the like to be used is in the range of 0.1 to 0.4% and it gives considerable improvements. As shown in Table 2 there is a moderate increase in flexibility from additions of the additive of the invention.

Table 2 is for a commercial mixture of 40–44% monoglyceryl stearate with diglyceryl and triglyceryl stearates.

Table 2. Typical Flexibility Values Obtained by Addition of a Commercial Mono- and Diglyceride Mixture to Tortillas Dose of mixture based Flexibility index after on weight of tortillas 0 hr. 24 hr. 48 hr. 72 hr. 0.0 % (Control) 8.0 5.0 4.0 4.0 0.2 %8.0 6.5 6.5 6.0 0.4 %8.5 6.7 6.5 6.0

INCORPORATION ADDITIVE

In adding mono- and diglycerides of fatty acids or as above and polyoxyethylene and mono- and di- compounds with the fatty acids such as monostearate, an effective procedure is as follows:

EXAMPLE 1

Twenty parts by weight of water and one part of starch is made into an aqueous suspension and then thickened by heating over a flame or on a steam bath with stirring to a temperature which exceeds the gelatinization point of the starch, usually about 160° F. Any edible starch may be used including commercial potato starch, corn starch, wheat flour starch, ordinary corn flour and limed corn flour. In effect the flour is used as starch. In a separate vessel one part by weight of additive such as mono- or diglyceride or a mixture thereof or polyoxyethylene mono- compound is weighed out and melted over a suitable heater. As soon as the starch suspension has thickened, the additive is slowly and totally added to the starch suspension with vigorous stirring. Stirring is continued for approximately five minutes after the last of the additives has been added to the starch paste.

EXAMPLE 2

Limed corn flour is added to water and incorporated in the dough mixture, the quantity of water being approximately 120% of the dry weight of the flour. Then the molten mixture of mono- and diglyceride in the thickened starch is added and incorporated by the dough mixing, counting the starch as part of the weight of the flour and counting the water as part of the water added.

EXAMPLE 3

The procedure of Example 2 is carried out except that the mixture of mono- and diglyceride and thickened starch is added to the water before mixing with the flour, counting the moisture therein as water, and counting the solid as part of the dry mix ingredients.

In both Example 2 and Example 3 the results as set forth in Table 2 are obtained.

EXAMPLE 4

The procedure of Example 2 is carried out except that 2 percent on the weight of the tortillas of polyoxyethylene monostearate is added. The results obtained are comparable to those set forth in Table 2.

In view of my invention and disclosure, variations and modifications to meet individual whim or particular need will doubtless become evident to others skilled in the art to obtain all or part of the benefits of my invention without copying the process and composition shown, and I, therefore, claim all such insofar as they fall within the reasonable spirit and scope of my claims.

Having thus described my invention what I claim as new and desire to secure by Letters Patent is:

1. A tortilla essentially consisting of nixtamalized corn or nixtamalized corn flour and from 0.1 to 0.4 percent by weight of a compound of the class consisting of mono- and diglycerides and mixtures thereof of fatty acids having a carbon chain length between 9 and 21 carbon atoms, and monoesters with such fatty acids of polyoxyethylene.

2. A tortilla of claim 1, in which the additive is a compound of the glass consisting of monoglyceryl stearate and diglyceryl stearate.

3. A tortilla dough essentially consisting of nixtamalized corn or nixtamalized corn flour, water and from 0.1 to 0.4 by weight of the tortilla of a compound of the class consisting of mono- and diglycerides and mixtures thereof of fatty acids having a carbon chain length between 9 and 21 carbon atoms, and mono- esters with such fatty acids of polyoxyethylene.

4. A tortilla dough of claim 3, in which the additive is a compound of the class of monoglyceryl stearate and diglyceryl stearate.

5. A process of making tortilla dough which will produce tortillas of improved flexibility after storage without loss of moisture, which comprises mixing nixtamalized corn or nixtamalized corn flour with water to make dough and incorporating in the dough from 0.1 to 0.4 percent by weight of the tortilla of a compound of the class consisting of monoglycerides and diglycerides of fatty acids having a carbon chain length between 9 and 21 carbon atoms inclusive and monoesters of polyoxyethylene with such fatty acids.

6. A process of claim 5, in which the additive is a compound of the class consisting of monoglyceryl and diglyceryl stearates and mixtures thereof.

* * * * *

UNITED STATES PATENT OFFICE
CERTIFICATE OF CORRECTION

Patent No. 3,653,915　　　　　　　　Dated April 4, 1972

Inventor(s) Manuel Jesus Rubio

It is certified that error appears in the above-identified patent and that said Letters Patent are hereby corrected as shown below:

On the cover sheet insert -- [73] Assignee Roberto Gonzalez Barrera, Monterrey, Mexico --.

Signed and sealed this 10th day of October 1972.

(SEAL)
Attest:

EDWARD M. FLETCHER, JR.　　　　　　　ROBERT GOTTSCHALK
Attesting Officer　　　　　　　　　　Commissioner of Patents FORM PO-1050 (10-69)　　　　　　　　　　　　　　　　　USCOMM-DC 60376-P69
　　　　　　　　　　　　　　　　　　　　　　☆ U.S. GOVERNMENT PRINTING OFFICE : 1969 O—366-334.